(12) United States Patent
Zheng et al.

(10) Patent No.: US 10,050,971 B2
(45) Date of Patent: *Aug. 14, 2018

(54) PORTAL AUTHENTICATION METHOD AND ACCESS CONTROLLER

(71) Applicant: HEWLETT PACKARD ENTERPRISE DEVELOPMENT LP, Houston, TX (US)

(72) Inventors: Tao Zheng, Beijing (CN); Jianfeng Liu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/754,405

(22) Filed: Jun. 29, 2015

(65) Prior Publication Data

US 2015/0304334 A1    Oct. 22, 2015

Related U.S. Application Data

(63) Continuation of application No. 14/131,166, filed as application No. PCT/CN2012/075720 on May 18, 2012, now Pat. No. 9,100,391.

(30) Foreign Application Priority Data

Aug. 18, 2011  (CN) .......................... 2011 1 0241974

(51) Int. Cl.
*H04L 29/06* (2006.01)
*H04W 12/06* (2009.01)
(Continued)

(52) U.S. Cl.
CPC ........ *H04L 63/101* (2013.01); *H04L 61/2015* (2013.01); *H04L 61/2061* (2013.01);
(Continued)

(58) Field of Classification Search
CPC . H04L 63/083; H04L 63/0892; H04L 63/101; H04L 61/6022; H04L 61/2015; H04L 61/2061

See application file for complete search history.

(56) References Cited

U.S. PATENT DOCUMENTS 7,542,468 B1    6/2009  Begley et al.
8,797,856 B1    8/2014  Ballal et al.
(Continued)

FOREIGN PATENT DOCUMENTS

CN    1697377    11/2005
CN    1708021    12/2005
(Continued)

OTHER PUBLICATIONS

Extended European Search Report dated Apr. 14, 2015, EP Patent Application No. 12824021.5 dated May 18, 2012, European Patent Office.

(Continued)

*Primary Examiner* — Beemnet Dada

(57) ABSTRACT

In a portal authentication method, a DHCP request message sent by a terminal is received by an AC. In response to finding that a user of the terminal is an unauthenticated user, a private network IP address is assigned to the terminal. After portal authentication of the terminal is finished, a wireless connection of the terminal is terminated by the AC. When a DHCP request message sent by the terminal again is received, a determination that the user of the terminal passes the authentication is made by the AC, a public network IP address is assigned to the terminal, and an accounting request message is sent to a RADIUS server. After finding that the terminal is offline, an accounting stop message is sent by the AC to the RADIUS server, the (Continued)

wireless connection of the terminal is disconnected, and the public network IP address is released.

20 Claims, 4 Drawing Sheets

(51) Int. Cl.
*H04W 84/12* (2009.01)
*H04L 29/12* (2006.01)
*H04L 29/08* (2006.01)

(52) U.S. Cl.
CPC ........ *H04L 61/6022* (2013.01); *H04L 63/083* (2013.01); *H04L 63/0876* (2013.01); *H04L 63/0892* (2013.01); *H04L 67/02* (2013.01); *H04W 12/06* (2013.01); *H04W 84/12* (2013.01)

(56) References Cited

U.S. PATENT DOCUMENTS

| | | | |
|---|---|---|---|
| 2003/0115344 A1* | 6/2003 | Tang | .................. H04L 63/0272 709/229 |
| 2008/0092213 A1* | 4/2008 | Wei | ..................... H04L 61/2015 726/4 |
| 2014/0223538 A1 | 8/2014 | Van De Velde et al. | |
| 2015/0032510 A1 | 1/2015 | Farahat | |

FOREIGN PATENT DOCUMENTS

| | | | |
|---|---|---|---|
| CN | 1728580 | 2/2006 | |
| CN | 101141492 | 3/2008 | |
| CN | 101286858 | 10/2008 | |
| CN | 101582856 | 11/2009 | |
| CN | 102244866 | 11/2011 | |
| CN | 1458763 | 11/2013 | |
| EP | 18767854 | 1/2008 | |
| EP | 1876754 A1 * | 2/2008 | ............ H04L 12/24 |
| JP | 2001211180 | 8/2001 | |

OTHER PUBLICATIONS

Gau Lu et al: The design for ethernet access concentrator, Proceedings International Conferences on Info-Tech and Info-Net (IC11) 2001. IEEE, Beijing, vol. 5, Oct. 29, 2001, pp. 223-228, CP010576991, DOI 10.1109/IC11.2001.983522, ISBN: 978-0-7803-7010-4 = figure 3, p. 223, line 30—p. 227, line 29.
International Search Report and Written Opinion dated Aug. 30, 2012 issued on PCT Patent Application No. PCT/CN2012/075720 filed on May 18, 2012, The State Intellectual Property Office, the P.R. China.
CN First Office Action dated Jun. 5, 2013 issued on CN Patent Application No. 201110241974.5 dated Aug. 18, 2011, The State Intellectual Property Office, P.R. China.
CN Second Office Action dated Feb. 8, 2014 issued on CN Patent Application No. 201110241974.5 dated Aug. 18, 2011, The State Intellectual Property Office, P.R. China.

* cited by examiner

PORTAL AUTHENTICATION METHOD AND ACCESS CONTROLLER

PRIORITY

This application is a Continuation of commonly assigned and co-pending U.S. patent application Ser. No. 14/131,166, filed Jan. 6, 2014, which is a national stage filing of PCT application number PCT/CN2012/075720, having an international filing date of May 18, 2012, which claims priority to Chinese patent application number 201110241974.5, filed on Aug. 18, 2011, the disclosures of which are hereby incorporated by reference in their entireties.

BACKGROUND

In a mobile Metropolitan Area Network (MAN) architecture, the secure authentication for a user is normally implemented in portal mode, and the authentication control point is located in an Access Controller (AC) of the MAN.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to. The term "based on" means based at least in part on. In addition, the terms "a" and "an" are intended to denote at least one of a particular element.

Figure 1:
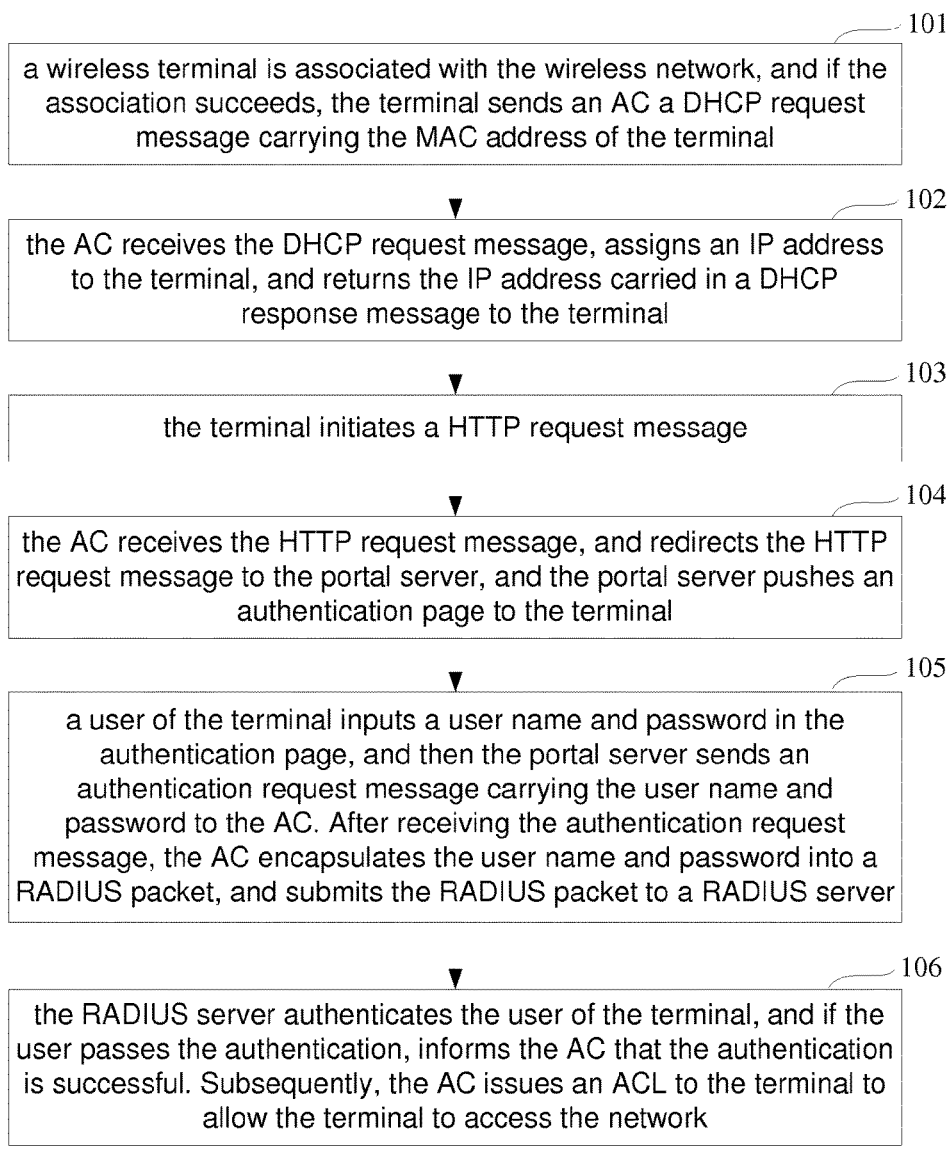
FIG. 1 is a schematic diagram illustrating a portal authentication when a terminal accesses an existing wireless network.

At first, the portal authentication when a terminal accesses an existing wireless network will be briefly described hereinafter with respect to FIG. 1. As shown in FIG. 1, the authentication process includes the following operations.

Block 101, firstly, a wireless terminal is associated with the wireless network, and if the association succeeds, the terminal sends an AC a Dynamic Host Configuration Protocol (DHCP) request message carrying the Media Access Control (MAC) address of the terminal.

Block 102, the AC receives the DHCP request message, assigns an Internet Protocol (IP) address to the terminal, and returns the IP address carried in a DHCP response message to the terminal.

If a DHCP template is configured in the AC, the AC assigns the IP address to the terminal itself, and returns the IP address carried in a DHCP response message to the terminal. If an external DHCP server is adopted, the AC needs to forward the DHCP request message to the DHCP server. The DHCP server assigns the IP address to the terminal, and returns the IP address carried in a DHCP response message to the AC, and then the AC returns the DHCP response message to the terminal.

Block 103, the terminal initiates a Hyper-Text Transfer Protocol (HTTP) request message.

Block 104, the AC receives the HTTP request message, and redirects the HTTP request message to the portal server, and the portal server pushes an authentication page to the terminal.

Block 105, a user of the terminal inputs a user name and password in the authentication page, and then the portal server sends an authentication request message carrying the user name and password to the AC. After receiving the authentication request message, the AC encapsulates the user name and password into a Remote Authentication Dial In User Service (RADIUS) packet, and submits the RADIUS packet to a RADIUS server.

Block 106, the RADIUS server authenticates the user of the terminal, and if the user passes the authentication, informs the AC that the authentication is successful. Subsequently, the AC issues an Access Control List (ACL) to the terminal to allow the terminal to access the network.

For a Wide Local Area Network (WLAN) user, after the user turns on a terminal, the terminal is automatically connected with the wireless network, and immediately initiates a DHCP request for obtaining an IP address, whether or not the user is authenticated, the terminal may obtain the IP address. Thus, the address resources are wasted. This is especially true with mobile networks because the mobile networks all assign a public network IP address to a user at present, and as such, the address resources are quite precious. The problem often occurs that a user really wanting to access the network cannot obtain an IP address, but a user that does not want to access the network unintentionally occupies an IP address.

Normally, in order to solve the IP-address-shortage problem, some applications adopt a Network Address Translation (NAT) mode. However, in the NAT mode, one public network address corresponds to multiple private network addresses and thus, a user cannot be precisely traced.

Examples of the present disclosure will be further described in detail hereinafter with reference to the accompanying drawings.

Figure 2:
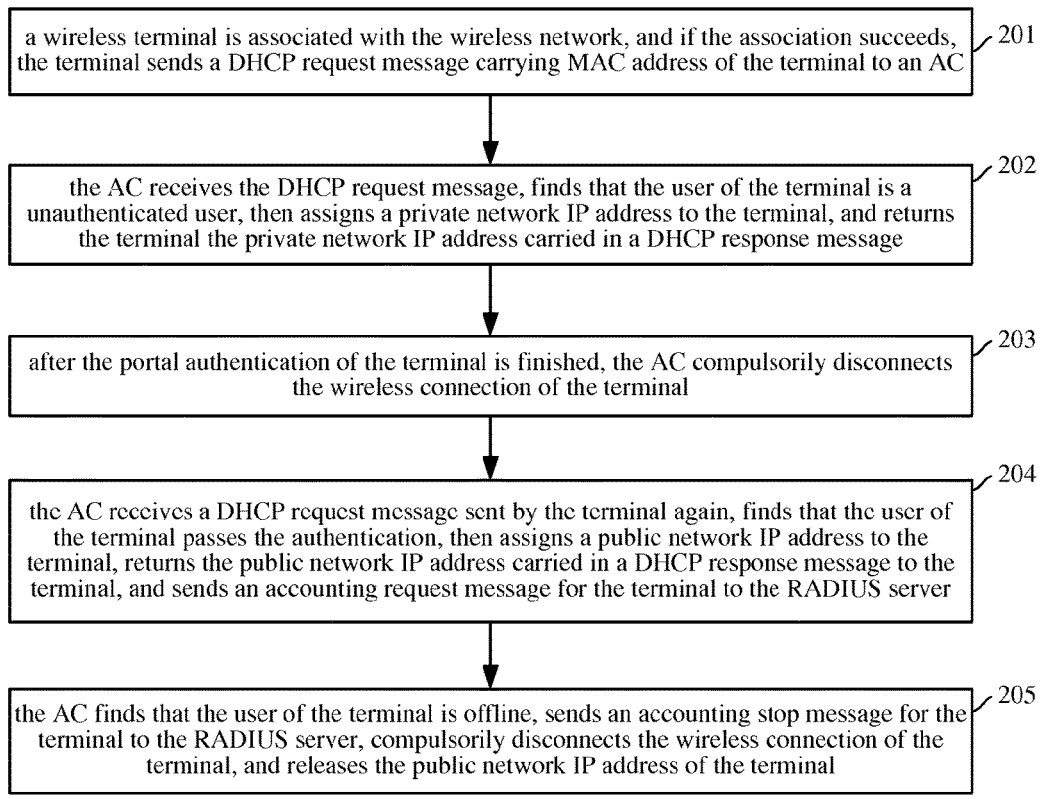
FIG. 2 is a flowchart illustrating a portal authentication method of a wireless terminal according to an example of the present disclosure.

FIG. 2 is a flowchart illustrating a portal authentication method of a wireless terminal according to an example of the present disclosure. As shown in FIG. 2, the method includes the following operations.

Block 201, a wireless terminal is associated with the wireless network, and if the association succeeds, the terminal sends a DHCP request message carrying a MAC address of the terminal to an AC.

Block 202, the AC receives the DHCP request message, finds that the user of the terminal is a unauthenticated user, then assigns a private network IP address to the terminal, and returns the private network IP address carried in a DHCP response message to the terminal.

The AC maintains an authenticated-user list. When a user of a terminal passes the authentication, the AC adds the MAC address of the terminal in the list. In the present operation, after receiving the DHCP request message, if the AC finds that the MAC address of the terminal carried in the DHCP request message is not in the authenticated-user list, the AC determines that the user of the terminal is an unauthenticated user.

If a DHCP template is configured in the AC, the AC assigns the private network IP address to the terminal itself, and returns the private network IP address carried in the DHCP response message to the terminal. If an external DHCP server is adopted, the AC plays a DHCP relay role, and forwards the DHCP request message sent by the terminal to the DHCP server. Here, an interface address carried in the DHCP request message is a private network IP address of the AC, to ensure the DHCP server to assign a private network IP address to the terminal.

Block 203, after the portal authentication of the terminal is finished, the AC disconnects the wireless connection of the terminal.

Block 204, the AC receives a DHCP request message sent by the terminal again, finds that the user of the terminal passes the authentication, then assigns a public network IP address to the terminal, returns the public network IP address carried in a DHCP response message to the terminal, and sends a RADIUS server an accounting request message indicating to start accounting for the terminal.

In the present operation, after receiving the DHCP request message, if the AC finds that the MAC address of the terminal carried in the DHCP request message is in the authenticated-user list, the AC determines that the user of the terminal passes the authentication.

If a DHCP template is configured in the AC, the AC assigns the public network IP address to the terminal itself, and returns the public network IP address carried in the DHCP response message to the terminal. If an external DHCP server is adopted, after receiving the DHCP request message, the AC needs to forward the DHCP request message to the DHCP server. The interface address in the DHCP request message is a public network IP address of the AC interface, to ensure the DHCP server to assign a public network IP address to the terminal.

Block 205, the AC finds that the user of the terminal is offline, sends the RADIUS server an accounting stop message indicating to stop the accounting for the terminal, disconnects the wireless connection of the terminal, and releases the public network IP address of the terminal.

If a DHCP template is configured in the AC, the AC directly informs the DHCP template to release the public network IP address of the terminal. If an external DHCP server is adopted, the AC imitates the terminal to send a DHCP release message carrying the MAC address of the terminal to the DHCP server. After receiving the DHCP release message, the DHCP server searches out the public network IP address of the terminal according to the MAC address of the terminal, and releases the public network IP address. When the user of the terminal is offline, the AC cancels the MAC address of the terminal from the authenticated-user list.

After the wireless connection of the terminal is disconnected, the terminal is associated with the wireless network again and requests an IP address. Since the user of the terminal becomes an unauthenticated user again, the AC will reassign a private network IP address to the terminal.

Figure 3:
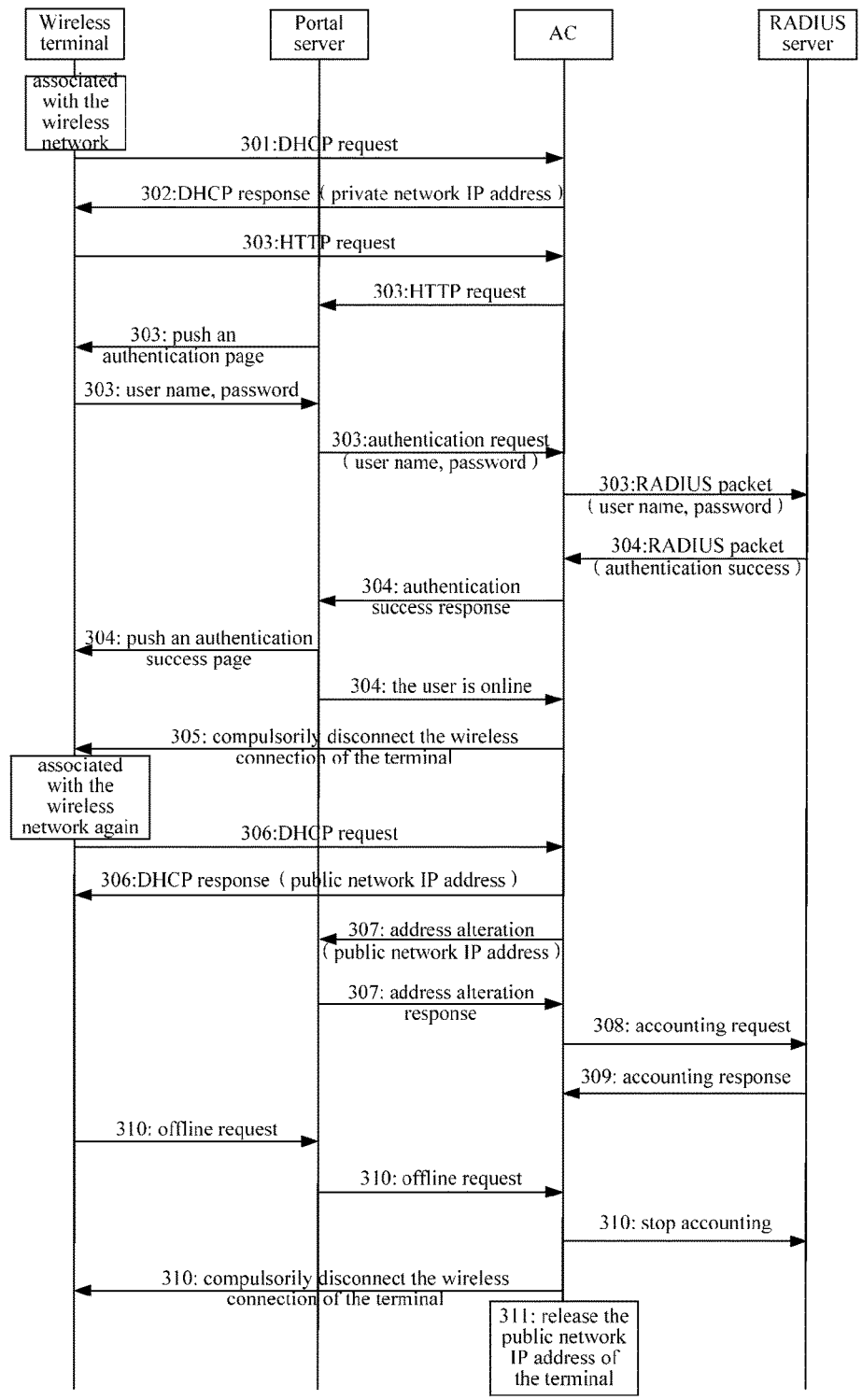
FIG. 3 is a flowchart illustrating a portal authentication method of a wireless terminal according to another example of the present disclosure.

FIG. 3 is a flowchart illustrating a portal authentication method of a wireless terminal according to another example of the present disclosure. As shown in FIG. 3, the method includes the following operations.

Block 301, a wireless terminal is associated with the wireless network, and if the association succeeds, the terminal sends a DHCP request message carrying a MAC address of the terminal to an AC.

Block 302, the AC receives the DHCP request message, finds that the user of the terminal is an unauthenticated user, assigns a private network IP address to the terminal, and returns the private network IP address carried in a DHCP response message to the terminal.

The AC maintains an authenticated-user list. When a user of a terminal passes the authentication, the AC adds a MAC address of the terminal in the list. In the present operation, after receiving the DHCP request message, if the AC finds that the MAC address of the terminal carried in the DHCP request message is not in the authenticated-user list, the AC determines that the user of the terminal is an unauthenticated user.

If a DHCP template is configured in the AC, the AC assigns the private network IP address to the terminal itself, and returns the private network IP address carried in the DHCP response message to the terminal. If an external DHCP server is adopted, the AC plays a DHCP relay role, and forwards the DHCP request message sent by the terminal to the DHCP server. Here, the interface address carried in the DHCP request message is a private network IP address of the AC, to ensure the DHCP server to assign a private network IP address to the terminal.

Block 303, the terminal initiates a random HTTP request message. The AC receives the HTTP request message, and redirects the HTTP request message to a portal server, and the portal server pushes an authentication page to the terminal. The user of the terminal inputs a user name and password in the authentication page, and then the portal server sends the user name and password carried in an authentication request message to the AC. After receiving the authentication request message, the AC encapsulates the user name and password into a RADIUS packet, and submits the RADIUS packet to a RADIUS server.

Block 304, the RADIUS server authenticates the user, and if the user passes the authentication, informs the AC that the user passed the authentication. The AC sends an authentication success response message to the portal server. The portal server receives the authentication success response message, pushes an authentication success page to the terminal, and informs the AC that the user of the terminal is online.

In this operation, the AC further adds the MAC address of the terminal in the authenticated-user list.

Block 305, The AC disconnects the wireless connection of the terminal.

Here, after disconnecting the wireless connection of the terminal, the AC may further release the private network IP address of the terminal. Specifically, if a DHCP template is configured in the AC, the AC directly informs the DHCP template to release the private network IP address of the terminal. If an external DHCP server is adopted, the AC imitates the terminal to send a DHCP release message carrying the MAC address of the terminal to the DHCP server. After receiving the DHCP release message, the DHCP server searches out the private network IP address of the terminal according to the MAC address of the terminal, and releases the private network IP address.

Block 306, the terminal is associated with the wireless network again, and after the association succeeds, the terminal initiates a DHCP request message to the AC again. The AC receives the DHCP request message, finds that the user of the terminal passes the authentication, then assigns a public network IP address to the terminal, returns the public network IP address carried in a DHCP response message to the terminal, and records a corresponding relation between the MAC address and the public network IP address of the terminal.

In this operation, after receiving the DHCP request message, if the AC finds that the MAC address of the terminal carried in the DHCP request message is in the authenticated-user list, the AC determines that the user of the terminal passes the authentication.

If a DHCP template is configured in the AC, the AC assigns the public network IP address to the terminal itself, and returns the public network IP address carried in the DHCP response message to the terminal. If an external DHCP server is adopted, after receiving the DHCP request message, the AC needs to forward the DHCP request message to the DHCP server. The interface address in the DHCP request message is a public network IP address of the interface of the AC, to ensure the DHCP server assigns a public network IP address to the terminal.

Block 307, the AC sends an address alteration message to the portal server, and the address alteration message carries the MAC address and the public network IP address of the terminal. The portal server receives the address alteration message, returns an address alteration response message to the AC, and records a corresponding relation of a user name, the MAC address and the public network IP address about the terminal in the portal server.

Block 308, the AC receives the address alteration response message, and sends a RADIUS server an accounting request message indicating to start accounting for the terminal.

Block 309, the RADIUS server receives the accounting request message, and returns an accounting response message. The user of the terminal starts to normally surf the Internet.

Block 310, the terminal actively initiates an offline request message carrying the public network IP address of the terminal. The portal server receives the offline request message, searches out the user name according to the public network IP address of the terminal, and sends the user name carried in the offline request message to the AC. The AC receives the offline request message, sends an accounting stop message carrying the user name to the RADIUS server, informs the portal server that the user of the terminal is offline, and disconnects the wireless connection of the terminal.

In this operation, after being informed that the user of the terminal is offline, the portal server further cancels the corresponding relation of user name, MAC address and public network IP address of the terminal. After the user of the terminal is offline, the AC further cancels the MAC address of the terminal from the authenticated-user list.

After the wireless connection of the terminal is disconnected, the terminal is associated with the wireless network again and requests an IP address. Since the user of the terminal becomes an unauthenticated user again, the AC will reassign a private network IP address to the terminal.

Block 311, the AC releases the public network IP address of the terminal.

If a DHCP template is configured in the AC, the AC directly informs the DHCP template to release the public network IP address of the terminal. If an external DHCP server is adopted, the AC imitates the terminal to send a DHCP release message carrying the MAC address of the terminal to the DHCP server. After receiving the DHCP release message, the DHCP server searches out the public network IP address of the terminal according to the MAC address of the terminal, and releases the public network IP address.

Figure 4:
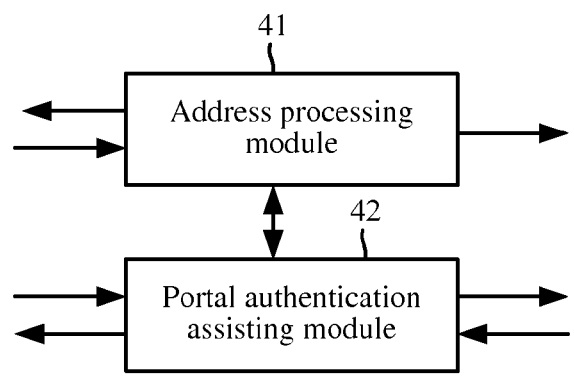
FIG. 4 is a block diagram illustrating a structure of an AC according to an example of the present disclosure.

FIG. 4 is a block diagram illustrating a structure of an AC according to an example of the present disclosure. As shown in FIG. 4, the AC includes an address processing module 41 and a portal authentication assisting module 42.

The address processing module 41 receives a DHCP request message sent by a wireless terminal. If finding that the user of the terminal is an unauthenticated user according to an authenticated-user list in the portal authentication assisting module 42, the address processing module 41 assigns a private network IP address to the terminal; and when receiving a user-IP-address-release instruction from the portal authentication assisting module 42, carrying the MAC address of the terminal, the address processing module 41 releases the private network IP address of the terminal. If finding that the user of the terminal is an authenticated user according to the authenticated-user list in the portal authentication assisting module 42, the address processing module 41 assigns a public network IP address to the terminal, and sends an address alteration message to a portal server. The address alteration message carries the MAC address and the public network IP address of the terminal. When receiving an address alteration response message returned by the portal server, the address processing module 41 sends an accounting request message to a RADIUS server. When finding that the terminal is offline, the address processing module 41 sends an accounting stop message carrying a user name of the terminal to the RADIUS server; cancels the MAC address of the terminal from the authenticated-user list in the portal authentication assisting module 42, disconnects the wireless connection of the terminal, and releases the public network IP address.

If a DHCP function is not configured for the AC, the address processing module 41 is further to forward a DHCP request message to the DHCP server after receiving the DHCP request message sent by the terminal. If finding that the user of the terminal is an unauthenticated user according to an authenticated-user list in the portal authentication assisting module 42, an interface address in the DHCP request message is a private network IP address of the AC; otherwise, the interface address in the DHCP request message is a public network IP address of the AC. The address processing module 41 sends a DHCP release message carrying the MAC address of the terminal to the DHCP server to release the private network IP address or the public network IP address of the terminal.

After receiving the HTTP request message initiated by the terminal, the portal authentication assisting module 42 redirects the HTTP request message to the portal server. After receiving an authentication request message carrying a user name and password sent by the portal server, the portal authentication assisting module 42 encapsulates the user name and password into a RADIUS packet, and sends the RADIUS packet to the RADIUS server. When receiving an authentication success information sent by the RADIUS server, the portal authentication assisting module 42 determines that the authentication is finished, adds the MAC address of the terminal into the authenticated-user list, disconnects the wireless connection of the terminal, and simultaneously sends a user-IP-address-release instruction carrying the MAC address of the terminal to the address processing module 41.

The address processing module 41 and the portal authentication assisting module 42 shown in FIG. 4 may be achieved with hardware circuit, or may be machine readable instructions stored in a memory.

Figure 5:
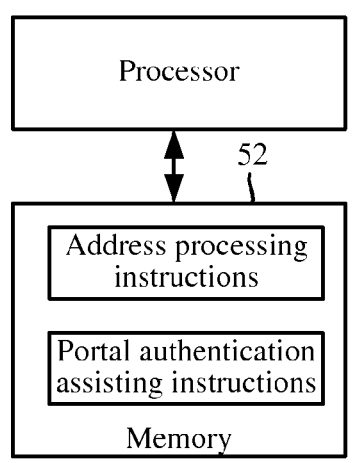
FIG. 5 is a block diagram illustrating a structure of an AC according to another example of the present disclosure.

FIG. 5 is a block diagram illustrating a structure of an AC according to another example of the present disclosure. As shown in FIG. 5, the AC includes a processor 51 and a memory 52.

The processor 51 is to communicate with the memory 52, and to execute machine readable instructions in the memory 52.

The memory 52 is to store the machine readable instructions, and the machine readable instructions may include address processing instructions 521 and portal authentication assisting instructions 522.

when being executed by the processor 51, the address processing instructions 521 are to: receive a DHCP request message sent by a wireless terminal, if the user of the terminal is found to be an unauthenticated user, assign a private network IP address to the terminal; when the portal authentication process of the terminal is finished, disconnect the wireless connection of the terminal; when a DHCP request message sent by the terminal again is received, determine that the user of the terminal passes the authentication, assign a public network IP address to the terminal, and send an accounting request message to a RADIUS server; when the terminal is found to be offline, send an accounting stop message to the RADIUS server, disconnect the wireless connection of the terminal, and release the public network IP address of the terminal.

When being executed by the processor 51, the portal authentication assisting instructions 522 are to: after a private network IP address is assigned to the terminal, if a HTTP request message initiated by the terminal is received, redirect the HTTP request message to a portal server; when a user name and password sent by the portal server is received, encapsulate the user name and password into a RADIUS packet, and send the RADIUS packet to the RADIUS server.

When being executed by the processor 51, the address processing instructions 521 are further to: after a public network IP address is assigned to the terminal, send the portal server an address alteration message carrying the MAC address and the public network IP address of the terminal; after receiving an address alteration response message returned by the portal server, send an accounting request message to the RADIUS server.

When being executed by the processor 51, the address processing instructions 521 are further to: after the portal authentication of the terminal is finished and the wireless connection of the terminal is disconnected, release the private network IP address of the terminal.

If a DHCP module is not configured in the AC, the address processing instructions 521 are executed by the processor further to: when the DHCP request message sent by the terminal is received and the user of the terminal is found to be an unauthenticated user, forward the DHCP request message to the DHCP server, and the interface address in the DHCP request message is a private network IP address of the AC; when a DHCP response message carrying a private network IP address returned by the DHCP server is received, forward the DHCP response message to the terminal; when a DHCP request message sent by the terminal again is received and the user of the terminal is determined as passing the authentication, forward the DHCP request message to the DHCP server, and the interface address in the DHCP request message is a public network IP address of the AC; when a DHCP response message carrying a public network IP address returned by the DHCP server is received, forward the DHCP response message to the terminal; after the portal authentication of the terminal is finished and the wireless connection of the terminal is disconnected, send a DHCP release message to the DHCP server; the DHCP release message carries the MAC address of the terminal, to inform the DHCP server to release the private network IP address of the terminal; after finding that the terminal is offline and the wireless connection of the terminal is disconnected, send a DHCP release message to the DHCP server. The DHCP message carries the MAC address of the terminal, to inform the DHCP server to release the public network IP address of the terminal.

The memory mentioned in the present disclosure includes a floppy disk, hard disk, magnetic optical disc, optical disc (such as CD-ROM, CD-R, CD-RW DVD-ROM, DVD-RAM, DVD-RW, DVD+RW), magnetic tape, nonvolatile memory, ROM, etc.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claim—and their equivalents—in which all terms are meant in their broadest reasonable sense unless otherwise indicated.

What is claimed is:

1. A method comprising:
   receiving, by an Access Controller (AC), a Dynamic Host Configuration Protocol (DHCP) request message sent by a wireless terminal associated with a wireless network to create a wireless connection in the wireless network to send the DHCP message;
   determining a user of the terminal is an unauthenticated user;
   providing, by the AC, a private network Internet Protocol (IP) address to the terminal in response to determining the user is an unauthenticated user;
   determining the user passes authentication;
   after assigning the private network IP address to the terminal and determining the user is authenticated, disconnecting the wireless connection of the terminal;
   releasing the private network IP address of the terminal; and
   providing a public network IP address to the terminal.

2. The method of claim 1, comprising:
   sending an accounting request message to a Remote Authentication Dial In User Service (RADIUS) server to start accounting for the terminal with the assigned public IP address.

3. The method of claim 2, comprising:
   determining the terminal is offline;
   sending, by the AC, an accounting stop message to the RADIUS server; and
   releasing the public network IP address of the terminal.

4. The method of claim 1, comprising:
   receiving, at the AC, a Hypertext Transfer Protocol (HTTP) request from the terminal after providing the private network IP address to the terminal;
   redirecting the HTTP request message to a portal server, wherein the portal server sends an authentication page to the terminal and receives a user name and password input by the user in the authentication page;
   receiving the user name and password at the AC from the portal server; and
   providing the username and password to a RADIUS server to authenticate the user.

5. The method of claim 4, comprising:
receiving from the RADIUS server a message indicating the user is authenticated; and
sending an authentication success message to the portal server, wherein the portal server sends an authentication success page to the terminal, and informs the AC that the user of the terminal is online.

6. The method of claim 5, comprising:
including a MAC address of the terminal in an authenticated-user list stored at the AC.

7. The method of claim 1, wherein a second wireless connection is established in the wireless network for the terminal and the method comprises:
receiving a second DHCP request message, wherein the public network IP address is provided to the terminal in response to the second DHCP message; and
storing a relation between a MAC address of the terminal and the public network IP address.

8. The method of claim 7, comprising:
sending an address alteration message to the portal server, wherein the address alteration message carries the MAC address and the public network IP address of the terminal, and the portal stores a relation of a user name, the MAC address and the public network IP address for the terminal.

9. The method of claim 8, comprising:
receiving an address alteration response message from the portal server; and
sending an accounting request message indicating to start accounting for the terminal to a RADIUS server.

10. The method of claim 8, wherein the terminal sends an offline request message including the public network IP address, and the portal server receives the offline request message, determines terminal information according to the public network IP address of the terminal, and sends an offline request message to the AC, wherein the method comprises:
receiving, at the AC, the offline request message;
sending an accounting stop message including terminal information to the RADIUS server; and
removing the MAC address of the terminal from an authenticated-user list.

11. An Access Controller (AC) comprising:
a processor; and
a data storage to store an authenticated-user list including users authenticated to access network resources,
wherein the processor is to:
determine whether a user of a terminal connected to a wireless network is an authenticated user according to information in the authenticated-user list in response to receiving a DHCP request message sent by the terminal via the wireless network;
provide a private network IP address to the terminal in response to determining the user is an unauthenticated user;
determine the user is subsequently authenticated;
include the user in the authenticated-user list;
provide a public network IP address to the terminal, wherein the terminal is operable to use the public network IP address to access the Internet;
send an accounting request message to a RADIUS server to start accounting for the terminal with the assigned public IP address;
determine the terminal is offline; and
send an accounting stop message to the RADIUS server, wherein the public network IP address of the terminal is released.

12. The AC controller of claim 11, wherein the processor is to:
receive an HTTP request from the terminal after providing the private network IP address to the terminal;
redirect the HTTP request message to a portal server, wherein the portal server sends an authentication page to the terminal and receives a user name and password input by the user in the authentication page;
receive the user name and password from the portal server; and
provide the username and password to a RADIUS server to authenticate the user.

13. The AC controller of claim 12, wherein the processor is to:
receive from the RADIUS server a message indicating the user is authenticated; and
send an authentication success message to the portal server, wherein the portal server sends an authentication success page to the terminal, and informs the AC that the user of the terminal is online,
wherein the user is included in the authenticated-user list by including a MAC address of the terminal in the authenticated-user list.

14. The AC controller of claim 11, wherein the terminal is a wireless terminal and associates with the wireless network to create a wireless connection in the wireless network to send the DHCP message, and the processor is to:
after assigning the private network IP address to the terminal and determining the user is authenticated, disconnect the wireless connection of the terminal; and
release the private network IP address of the terminal.

15. The AC controller of claim 14, wherein a second wireless connection is established in the wireless network for the terminal and the processor is to:
receive a second DHCP request message, wherein the public network IP address is provided to the terminal in response to the second DHCP message; and
store a relation between a MAC address of the terminal and the public network IP address.

16. The AC controller of claim 11, wherein the processor is to:
receive an offline request message from the terminal; and
remove a MAC address of the terminal from the authenticated-user list, wherein the public network IP address is released in response to the offline request message.

17. A network apparatus comprising:
a processor; and
a network interface connectable to a wireless terminal via a wireless network,
wherein the processor is to:
determine whether a user of the wireless terminal is an authenticated user in response to receiving a DHCP request message sent by the terminal via the wireless network;
provide a private network IP address to the wireless terminal in response to determining the user is an unauthenticated user;
determine the user is subsequently authenticated;
provide a public network IP address to the wireless terminal, wherein the wireless terminal is operable to use the public network IP address to access the Internet;
send an accounting request message to a RADUIS server to start accounting for the wireless terminal with the assigned public IP address;
determine the wireless terminal is offline; and send an accounting stop message to the RADIUS server, wherein the public network IP address of the wireless terminal is released.

18. The method of claim 1, wherein providing the public network Internet Protocol (IP) address to the terminal comprises providing the public network Internet Protocol (IP) address in response to determining the user passes authentication.

19. The AC controller of claim 11, wherein the processor provides the public network IP address to the terminal in response to determining that the user is subsequently authenticated.

20. The network apparatus of claim 17, wherein the processor provides the public network IP address to the terminal in response to determining that the user is subsequently authenticated.

* * * * *